United States Patent
Takeda

(10) Patent No.: US 6,713,717 B2
(45) Date of Patent: Mar. 30, 2004

(54) METHOD OF MANUFACTURING A GOLF CLUB HEAD

(75) Inventor: Hitoshi Takeda, Tsubame (JP)

(73) Assignee: Kabushiki Kaisha Endo Seisakusho (JP)

( * ) Notice: Subject to any disclaimer, the term of this patent is extended or adjusted under 35 U.S.C. 154(b) by 0 days.

(21) Appl. No.: 10/199,149

(22) Filed: Jul. 19, 2002

(65) Prior Publication Data

US 2003/0017886 A1 Jan. 23, 2003

(30) Foreign Application Priority Data

Jul. 23, 2001 (JP) ........................................ 2001-221915

(51) Int. Cl.[7] .............................................. B23K 26/00
(52) U.S. Cl. ............................. 219/121.69; 219/121.85
(58) Field of Search ...................... 219/121.69, 121.64, 219/121.85; 473/324, 342, 345

(56) References Cited

U.S. PATENT DOCUMENTS 5,261,663 A * 11/1993 Anderson .................. 473/342
5,460,371 A * 10/1995 Takeda ...................... 473/345
6,238,300 B1 * 5/2001 Igarashi ..................... 473/324
6,497,629 B2 * 12/2002 Takeda ...................... 473/324
2002/0016217 A1 * 2/2002 Takeda et al. .............. 473/324

FOREIGN PATENT DOCUMENTS

JP    6305241 A    11/1994

* cited by examiner

Primary Examiner—M. Alexandra Elve
(74) Attorney, Agent, or Firm—Akerman Senterfitt

(57) ABSTRACT

A method of manufacturing a golf club head by which face lines, a club number display and logo marks can be formed without being affected by the configuration and material of the club head. Face lines 10, a club number display 11 and logo marks 12 and 13 are formed on the surface of a golf club head 1, using a laser beam processing machine. Stamps and receiving dies are no longer required for a respective production lot number or a respective club number, so that costs and time required for fabricating impressing stamp dies and receiving dies can be saved. Further, face lines 10, club number display 11 and logo marks 12 and 13 are able to be formed without being affected by the configuration and material of the golf club head 1.

6 Claims, 2 Drawing Sheets

METHOD OF MANUFACTURING A GOLF CLUB HEAD

BACKGROUND OF THE INVENTION a) Field of the Invention

The present invention relates to a method of manufacturing a golf club head, having a face line, a club number display and a logo mark on a surface thereof.

b) Prior Art

A golf club is made up of a head and a shaft, and it is typically classified into three groups, i.e., a wood, an iron and a putter. The iron and wood are classified according to the loft angle. For the iron, for example, a small loft angle (for example 20° to 30°) iron is referred to as a long iron, while a large loft angle (for example 40° to 50°) iron is referred to as a short iron. Normally, irons are numbered from the long iron to the short iron, for example from No.1 to No.9, and then there is a PW (pitching wedge), a SW (sand wedge), and etc. These numbers and symbols are generally called club numbers, attached to respective club heads.

Iron club heads are formed from iron or other various kinds of metallic materials. Whilst wood club heads were formed from wood materials such as persimmon in the past, they are mainly formed from metallic materials in recent years, such as so-called metal wood.

In general, methods for manufacturing a metallic golf club head are classified into two categories, i.e., casting and forging. Forging is superior to casting in that it can produce a golf club head of higher strength. Forging is a method by which a golf club head of a desired shape can be obtained by heating a metallic round rod material first, and then hammering it with a press or a hammer, using a die to thereby subject it to plastic deformation. In the broad sense of the term, "forging" includes deep drawing as well in which a rolled metallic plate is die cut and then subjected to deep drawing.

In golf club heads manufactured by plastic forming such as forging, a face line provided on a face, a club number marking provided on a sole surface or the like and a logo mark provided on a sole, back, hosel or the like, are each formed by press forming, using a die or a stamp. For example, a face line is formed, using a linear die, while club number marking and logo mark are formed, using an impressing stamp.

For such press forming, a receiving die for rigidly retaining a golf club head against the pressing force is required. Further, as golf clubs have different configurations per each product and club number, respective specific receiving dies, corresponding to the respective linear dies and impressing stamp dies, must be prepared in addition to such linear dies and impressing stamp dies. Furthermore, as club heads of the same club number sometimes define slightly different configurations per each production lot number, there occurs a problem that the use of a receiving die that does not fit in with the configuration of a certain head could damage products or cause irregular face lines to be formed, so that it has been necessary to modify the receiving die every time the production lot number changes. Accordingly, the manufacture and modification of linear dies, impressing stamp dies and receiving dies have been too expensive and too time consuming.

In recent years, golf clubs of complex configurations have appeared to pursue a higher performance, some of which have too complex configurations to be received by a receiving die. If such golf clubs are forcedly received by a receiving die, die marks or scars would be inevitably produced so that it would be necessary to carry out a grinding process to clear away such die marks or scars. As a result, there has been a problem that production process and method are subject to many restrictions. Besides, as metallic materials having high hardness or low toughness are not suitable for cold press, there has been a problem that it is difficult to form face lines or the like in the case that such materials are used.

One of solutions for solving the above-mentioned problem is disclosed in Japanese Un-Examined Publication No.6-305241, in which a surface of a golf club head is irradiated with laser beam so as to change the color tone of a portion that was irradiated with laser beam on the surface of the club head, whereby suitable marking is carried out. According to such conventional marking method, however, the marking on a sole surface or the like is liable to be easily worn away due to the frictional contact with the earth. Further, whilst a face line needs to be formed as a concavity in order to apply spin to a ball, a face line formed by the above conventional marking method merely varies the color tone of the surface of a club head, and thus such face line is of no use.

SUMMARY OF THE INVENTION

To eliminate the above-mentioned problems, it is, therefore, a main object of the present invention to provide a method of manufacturing a golf club head To attain the above object, there is provided, in accordance with an embodiment of the invention, a method of manufacturing a golf club head, having a face formed on a front and a shaft attachment portion formed on one side, wherein a concave portion is formed on a surface of said golf club head, using a laser beam processing machine.

Accordingly, it is possible to form a concave portion on a surface of the golf club head without conventional press-forming process. Thus, impressing stamp dies or receiving dies for a specific product or club number are no longer required, thereby saving costs and labor required for the manufacture or modification of those dies. Further, it is possible to form a concave portion without being affected by the configuration or material of a golf club head.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF PREFERRED EMBODIMENTS

Hereinafter will be described embodiments of the invention with reference to the attached drawings, in which an iron golf club is described as an example.

Figure 1:
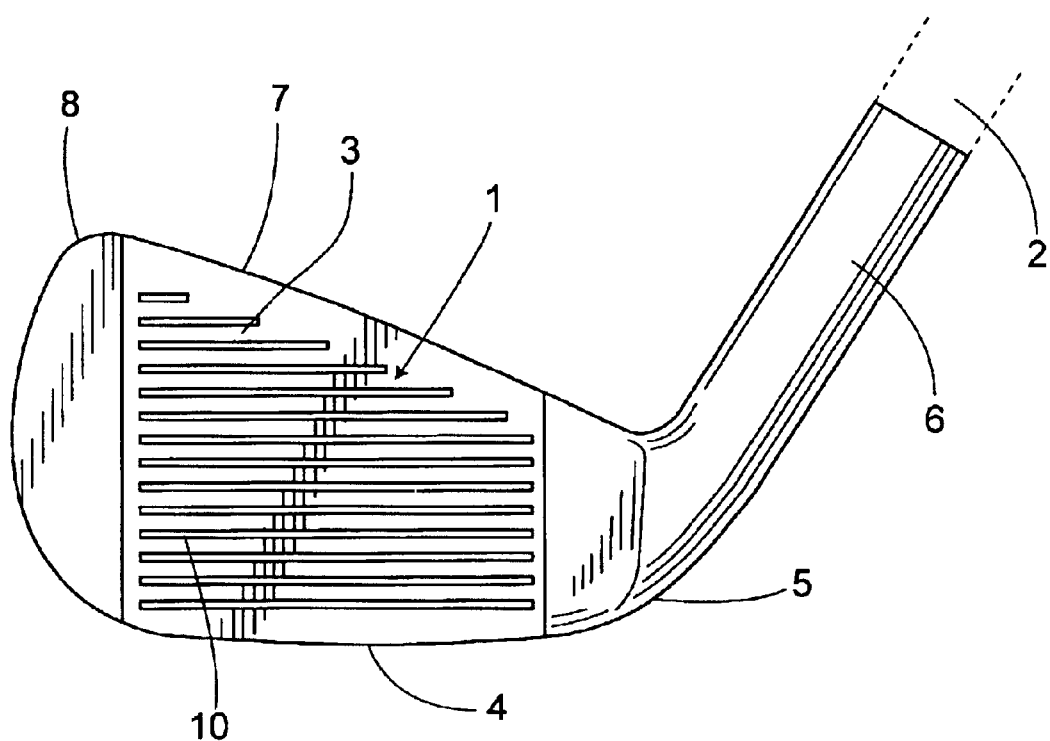
FIG. 1 is a front view of a golf club head manufactured according to an embodiment of the invention.
Figure 2:
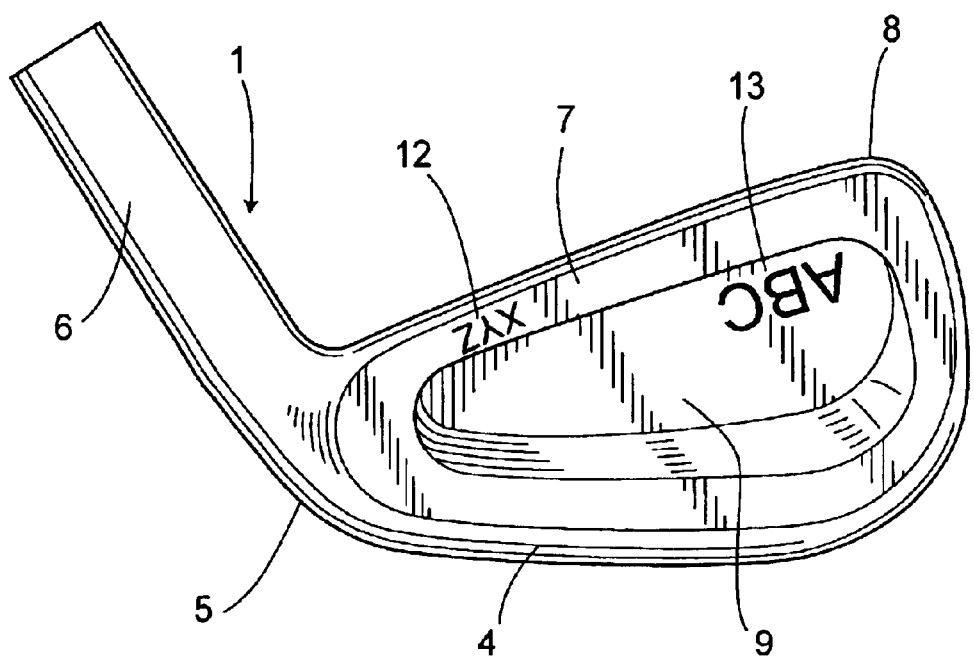
FIG. 2 is a rear view of a golf club head manufactured according to the embodiment of the invention.
Figure 3:
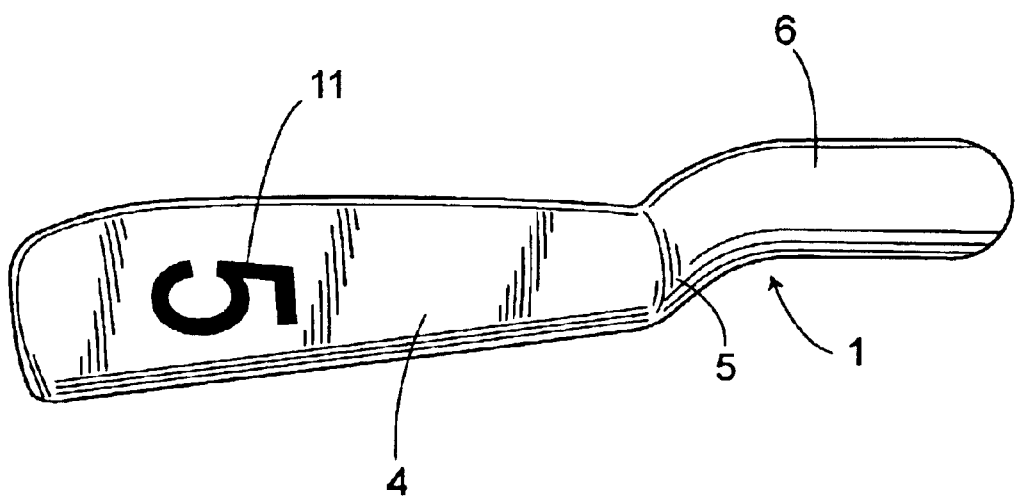
FIG. 3 is a bottom view of a golf club head manufactured according to the embodiment of the invention.

As shown in FIGS. 1 through 3, an iron golf club is made up of a head 1 and a shaft 2, of which the head 1 is made from a metallic material such as low-carbon steel, stainless steel or titanium-based alloy, including a face 3 for striking balls on a front, a sole 4 on a bottom, a heel 5 on one side, a toe 8 on the other side, a shaft attachment portion 6 provided at an upper part of the heel 5 for connecting the shaft 2 thereto and a top 7 at a top portion, respectively. A rear surface of the head 1 is formed with a cavity 9, substantially opposite to the face 3.

The face 3 is formed with a plurality of face lines 10 extending laterally, respectively. Each face line of a V-shaped or a U-shaped profile is formed as a concave portion on a surface of the face 3, using a laser processing machine. The sole 4 is formed with a club number display 11, which is also formed as a concave portion on the surface of the sole 4, using a laser processing machine. Further, logo marks 12 and 13 are formed on the top 7 and the cavity 9 on the rear surface of the head 1, respectively, as shown in FIG. 2. These logo marks 12 and 13 are each formed as a concave portion on the rear surface of the top 7 and the bottom surface of the cavity 9, respectively, using a laser processing machine.

Next, a method for manufacturing the head 1 will be described.

For a raw material processing step, a round bar (not shown) made from a metallic material such as low carbon steel, stainless steel, or titanium-based alloy is cut to a predetermined length to form a round bar material. Next, the round bar material is heated to form a head body through a hot forging step. As it is difficult to form the head 1 at one stroke, the forging step includes rolling and multi-step forging such as preforming, intermediate forging and finish forging. By performing the forging process through plural strokes, the head material is gradually stretched due to the plastic deformation in small steps so as to be finished to a final configuration.

Next, the burrs of the head body produced during the forging step are removed while the head body is subjected to a cutting process. Any suitable cutting process is chosen, corresponding to the configuration and design of the head 1 and the cavity 9 in a final product. Specifically, cutting process with a turning tool or a milling tool may be performed.

Thereafter, the finishing process is performed. The finishing process includes: surface polishing; drilling for forming a hole in a shaft center of the shaft attachment portion 6 for fitting the lower end of the shaft 2 thereinto; reaming; and forming faces lines 10, club number display 11, and logo marks 12 and 13, using a laser processing machine. When forming the face lines 10, the head 1 is cut to define grooves each having several microns'0 width, with the laser beam being reciprocated along the longitudinal direction of each face line 10, and thus any desirable profile of the face line, such as V-shaped, U-shaped or trapezoidal profile, can be set.

In the present invention, there is proposed no specific sequence of processes for forming the face lines 10, club number display 11, and logo marks 12 and 13, using a laser beam processing machine, which, however, may preferably be performed after the surface polishing process. Then, plating, sandblasting and coloring are performed to finish the head 1.

According to the foregoing embodiment, there is provided a method of manufacturing the golf club head 1, having the face 3 formed on a front and the shaft attachment portion 6 formed on one side, wherein the face lines 10, the club number display 11 and the logo marks 12 and 13 are formed on the surface of the golf club head 1, using a laser beam processing machine.

Accordingly, as the face lines 10, the club number display 11 and the logo marks 12 and 13 are able to be formed on the surface of the head 11 without conventional pressing process, linear dies for press-forming face lines, impressing stamp dies for press-forming club number display and logo marks, and receiving dies for use with the respective press-forming, are no longer required, per each production lot number or club number, thus saving cost and time required for fabricating or modifying such linear dies, impressing stamp dies and receiving dies. Further, as maintenance and storage of such dies are no longer required, costs therefor can be eliminated.

Furthermore, as the face lines 10, the club number display 11 and the logo marks 12 and 13 can be formed without being affected by the configuration of the golf club head 1, degree of freedom in designing a golf club head can be increased so that the configuration and design thereof can be saved from becoming stereotypic, thus making it possible to provide a high performance golf club head, corresponding to individual user's preference. Particularly in the case that the face 3 is thin, the face 3 is likely to be distorted due to stress when press-forming the face lines 10, which, however, can be avoided by forming the face lines 10, using a laser processing machine according to the embodiment of the invention. Moreover, it is possible to easily form the face lines 10, the club number display 11 and the logo marks 12 and 13 without being affected by the hardness or toughness of the metallic material.

Also, as no pressure is applied when forming the face lines 10, club number display 11 and logo marks 12 and 13, unlike conventional methods, a simple tool for retaining the head 1 will suffice at the time of the processing. Additionally, deviations in head configuration per production lot number, or any other difference in head configuration can be quickly responded to by devising such retaining tool.

Still also, as die marks or scars have heretofore been often produced due to the head 1 being strongly pressed against the receiving die when press-forming the face lines 10, club number display 11 and logo marks 12 and 13, so that it has been necessary to carry out a grinding process to clear such die marks or scars. As a result, there has been a problem that production process and method are subject to many restrictions. According to the present embodiment using a laser beam processing machine, the head 1 can be free from such die marks or scars when forming the face lines 10, club number display 11 and logo marks 12 and 13, and thus the production process and method are subject to few restrictions. Alternatively, the face lines 10, club number display 11 and logo marks 12 and 13 may be formed in a final product of the head 1 which has gone through all the manufacturing steps, according to user's preference. Such feature that the face lines 10, club number display 11 and logo marks 12 and 13 can be formed irrespectively of the sequence of manufacturing steps is particularly advantageous in carrying out surface treatment or the like.

In addition to the foregoing, the embodiment of the invention is advantageous as the face lines 10, club number display 11 and logo marks 12 and 13 are each formed as a concavity, they can be formed into the same shape as conventional one, so that the performance of the club head is not affected by anything.

Incidentally, the present invention should not be limited to the foregoing embodiments, but may be variously modified within a scope of the invention. Although hot forging is taken as an example in the embodiment, other processes such as cold forging, cold pressing or casting may be employed, such as. Further, the golf club head 1 should not be limited to an iron golf club, but may be a metallic wood or a putter golf club.

What is claimed:

1. A method of manufacturing a golf club head, having a face formed on a front and a shaft attachment portion formed on one side, wherein a concave portion is formed on a surface of said golf club head by cutting said golf club head using a laser beam processing machine, wherein concave portion is a face line provided on said face.

2. A method of manufacturing a golf club head, having a face formed on a front and a shaft attachment portion formed on one side, wherein a concave portion is formed on a surface of said golf club head by cutting said golf club head using a laser beam processing machine, said concave portion being a club number display.

3. A method of manufacturing a golf club head, having a face formed on a front and a shaft attachment portion formed on one side, wherein a concave portion is formed on a surface of said golf club head by cutting said golf club head using a laser beam processing machine, said concave portion being a logo mark.

4. A method of manufacturing a golf club head according to claim 1, wherein said concave portion is formed after surface polishing.

5. A method of manufacturing a golf club head comprising the steps of:

cutting a round bar made from a metallic material to a predetermined length to form a round bar material;

heating the round bar material to form a head body through a hot forging step, including rolling and multi-step forging such as preforming, intermediate forging and finish forging;

removing burrs from the head body, said burrs being produced during the hot forging step, while subjecting the head body to a cutting process, using a turning tool or a milling tool;

surface polishing, drilling for forming a hole in a shaft center of the shaft attachment portion and reaming; and forming face lines, a club number display and a logo mark, by cutting said golf club using a laser processing machine.

6. A method of manufacturing a golf club head according to claim 1, wherein a plurality of said face lines are formed on the surface of said golf club head by cutting said golf club head with a laser emitted from said laser beam processing machine, said laser beam being linearly reciprocated from one end to the other end.

* * * * *